US 6,377,668 B1

(12) United States Patent
Smock et al.

(10) Patent No.: US 6,377,668 B1
(45) Date of Patent: Apr. 23, 2002

(54) INTERNET PRIORITY CALL DEVICE

(75) Inventors: Gary S. Smock, Arvada; William C. McClure, Aurora; Charles E. Copeland, Northglenn, all of CO (US)

(73) Assignee: Command Communications, Inc., Englewood, CO (US)

( * ) Notice: Subject to any disclaimer, the term of this patent is extended or adjusted under 35 U.S.C. 154(b) by 0 days.

(21) Appl. No.: 09/084,331

(22) Filed: May 26, 1998

(51) Int. Cl.[7] .......................... H04M 15/06; H04M 3/42
(52) U.S. Cl. .............................. 379/142.08; 379/215.01
(58) Field of Search ................................ 379/142, 97.35, 379/215, 199, 127, 142.01, 142.04, 142.07, 142.08, 215.01, 93.35

(56) References Cited

U.S. PATENT DOCUMENTS

| | | | |
|---|---|---|---|
| 4,490,583 A | * 12/1984 | Bednarz et al. | 379/161 |
| 4,852,151 A | * 7/1989 | Dittakavi et al. | 379/93.35 |
| 4,995,074 A | 2/1991 | Goldman et al. | |
| 5,467,388 A | * 11/1995 | Redd, Jr. et al. | 379/142 |
| 5,517,557 A | 5/1996 | Tanaka | 379/67.1 |
| 5,550,908 A | * 8/1996 | Cai et al. | 379/93.35 |
| 5,790,656 A | 8/1998 | Rahamim et al. | 379/399 |
| 5,805,587 A | * 9/1998 | Norris et al. | 379/93.35 |
| 5,809,128 A | * 9/1998 | McMullin | 379/93.35 |
| 5,841,850 A | * 11/1998 | Fan | 379/142 |
| 5,940,485 A | * 8/1999 | Sapra et al. | 379/142 |
| 5,940,489 A | * 8/1999 | Cohn et al. | 379/215 |
| 5,974,043 A | * 10/1999 | Solomon | 379/215 |
| 5,982,774 A | * 11/1999 | Foladare et al. | 379/142 |
| 6,038,443 A | 3/2000 | Luneau | 379/142 |
| 6,067,353 A | * 5/2000 | Szeliga | 379/93.35 |

* cited by examiner

Primary Examiner—Curtis Kuntz
Assistant Examiner—Rexford N Barnie
(74) Attorney, Agent, or Firm—James E. Pittenger

(57) ABSTRACT

A method and apparatus to inform an online computer user of the presence of an incoming telephone call without disturbing an associated modem connection is disclosed. A device is connected to a telephone line, modem and telephone set, and utilizes a call waiting service provided by the telephone company. Upon detection of a call waiting signal the device generates a four second warbling tone to a piezoelectric sounder alerting the user to the presence of an inbound telephone call. The user may answer or ignore the telephone call. Caller identifiers included in incoming calls may be used to alert the user of the origin of the incoming call before the user decides to accept or ignore the call. When the device determines that the user has lifted the telephone set, it places the modem on hold, generates a signal displayed as a colored LED display, connects the telephone to the incoming tip/ring connection, thus establishing a connection to the caller. When the user terminates the call by replacing the telephone set, the device may generate another signal displayed on the LED display, and reconnect the modem to the Internet service provider.

21 Claims, 3 Drawing Sheets

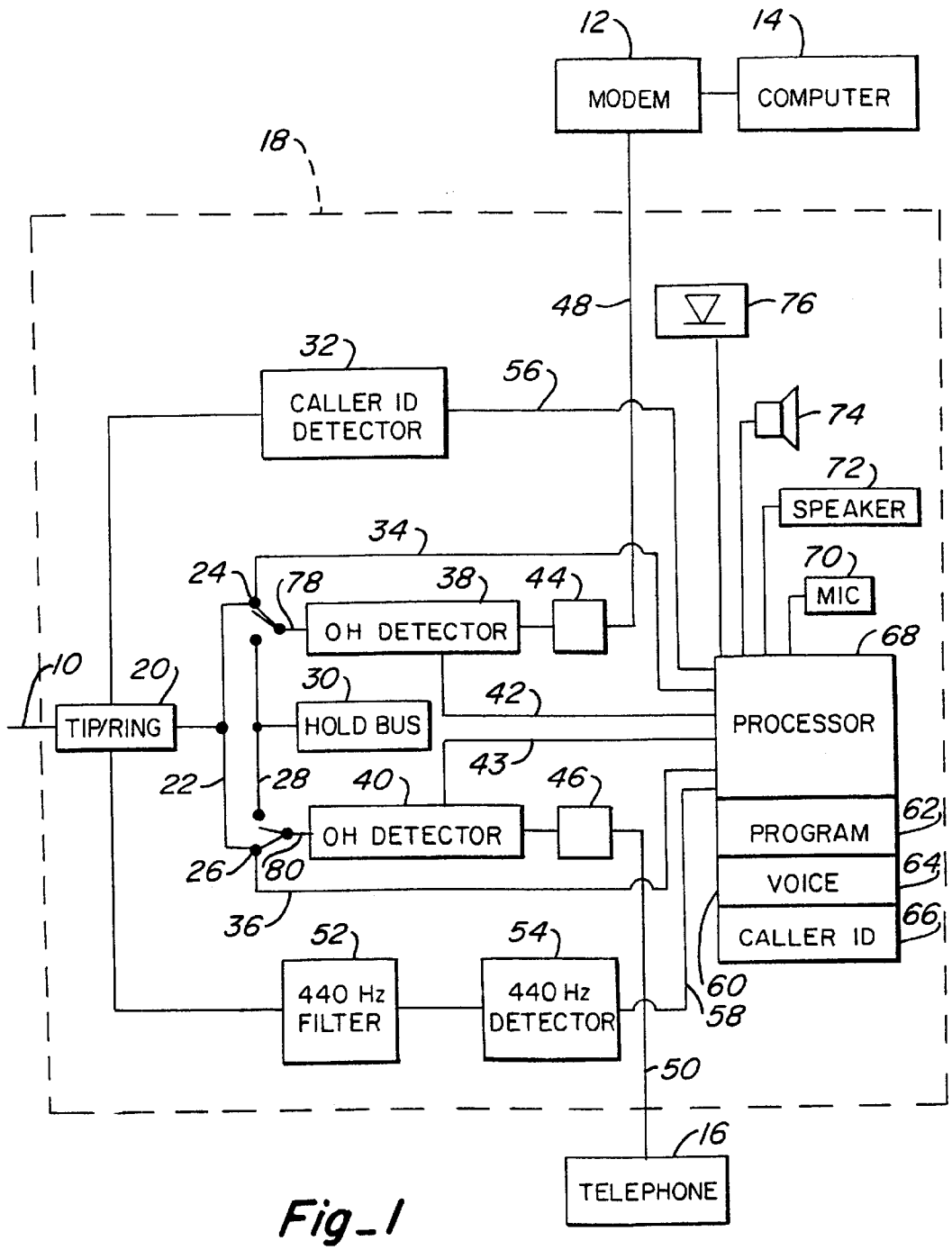
Fig_1

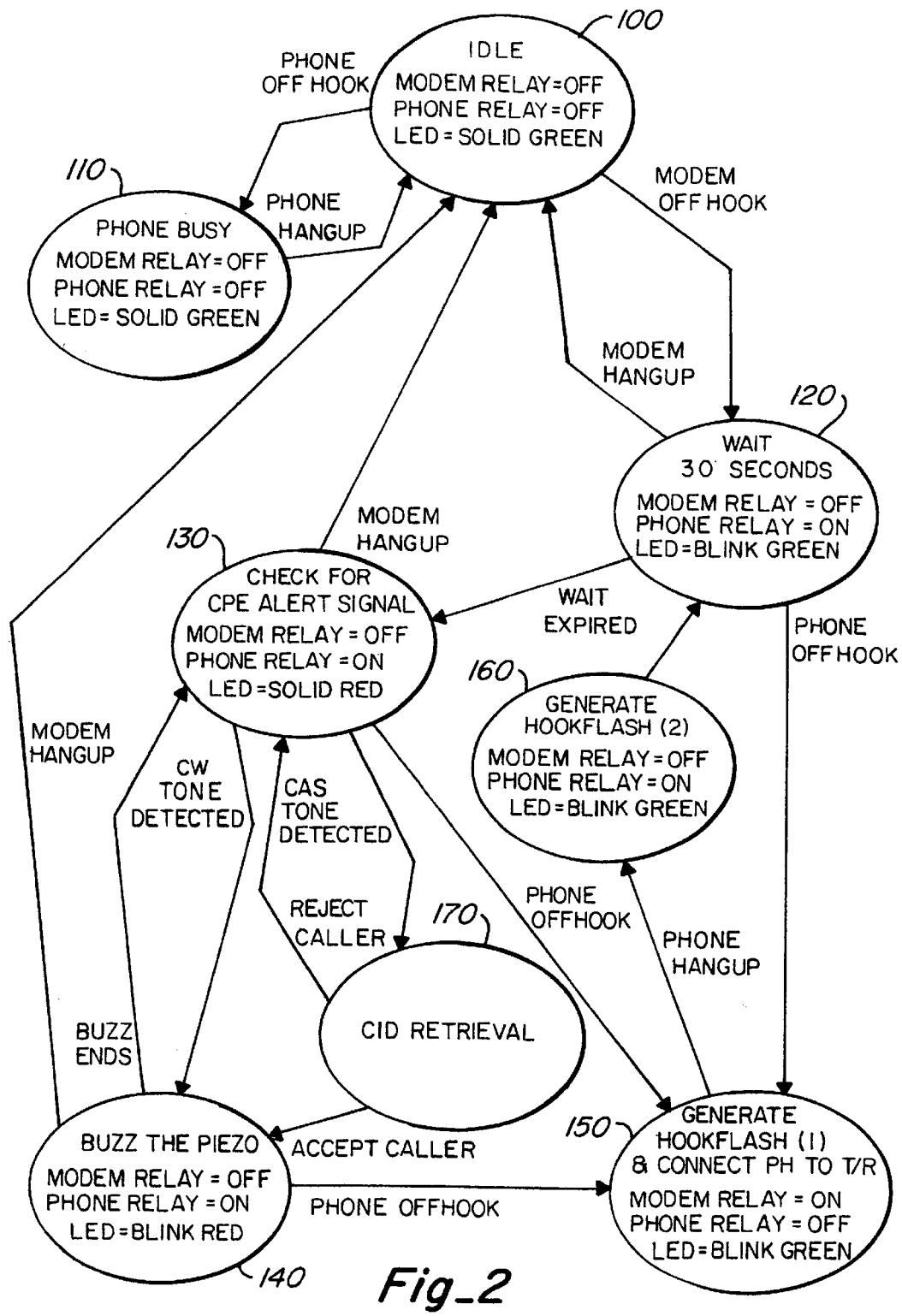
Fig_2

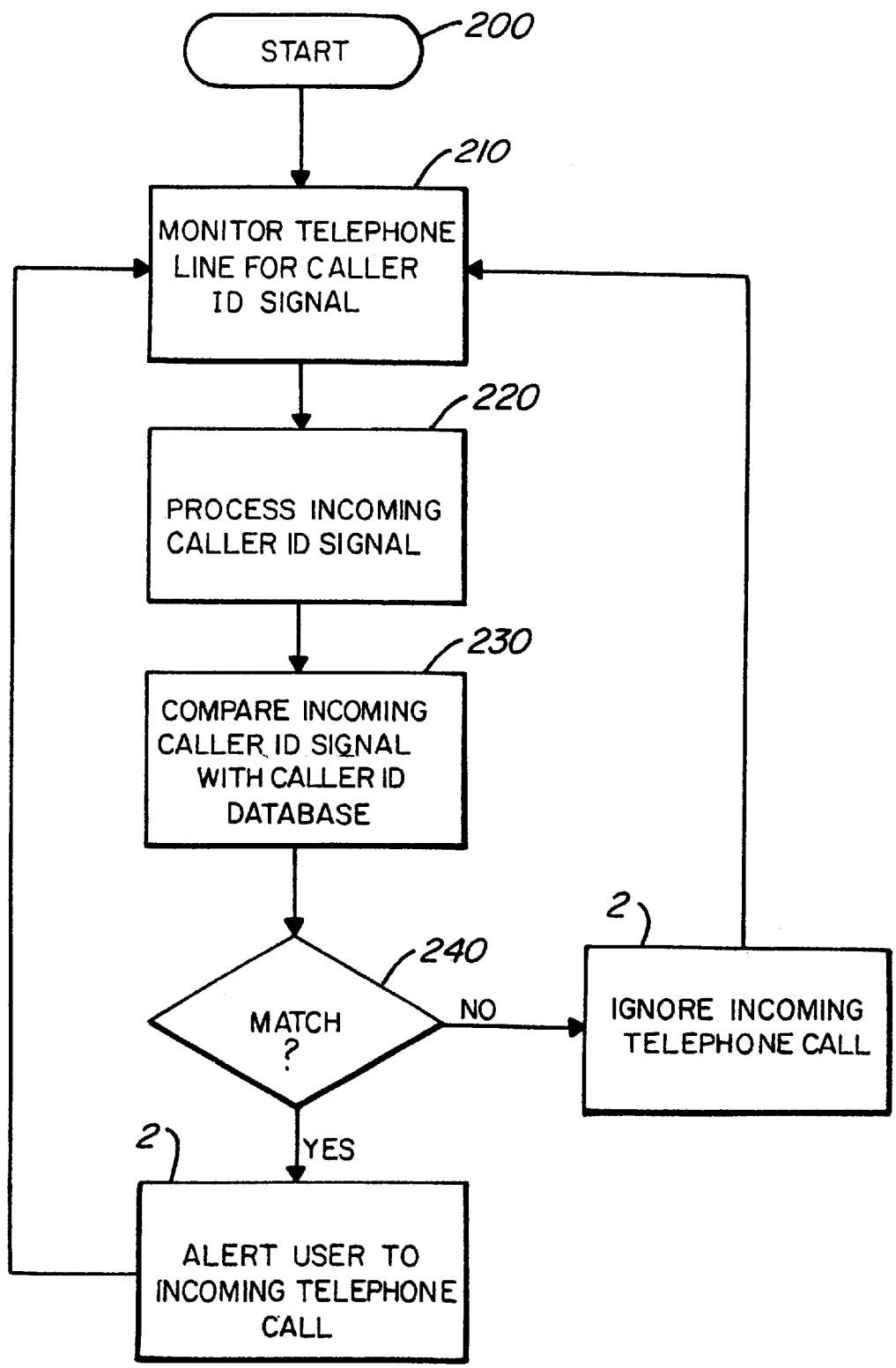
Fig_3

INTERNET PRIORITY CALL DEVICE

FIELD OF THE INVENTION

The present invention relates broadly to the field of telephony and the use of modems and computers. More specifically, the present invention relates to a method and apparatus for informing a computer modem user of the presence of an inbound telephone call, and allowing the user to place the modem connection on hold, receive the call, and either preserve or sever the modem connection.

BACKGROUND OF THE INVENTION

With the proliferation of Internet Service Providers (ISP), increased modem capacity and the growing popularity of global computer networks, many people spend considerable amounts of time at their computers connected to their respective ISP via a modem. In order to preserve the modem connection, the popular telephone feature of call waiting must be disabled, or data transfer over the modem will be disturbed. However, some modems are able to recover from the interruption of call waiting, and may restore any lost data by sending an interrupt to the other modem. Thus, the call waiting signal is unnoticeable to the computer user. As a result, the computer user is unreachable by telephone while connected to the ISP unless a second telephone line is provided. Many existing homes have only one telephone line, and the cost of installing a second telephone line and paying an additional monthly service fee make the second telephone line an undesirable solution.

Another popular telephone feature is caller ID, where the telephone number and possibly the name of the caller is displayed to a user before the user accepts the incoming call. A device that could utilize the features of call waiting and caller ID to allow a user to identify callers while simultaneously using a computer modem on the same telephone line would prove very convenient and useful.

PRIOR ART DISCLOSURE STATEMENT

U.S. Pat. No. 4,995,074 to Goldman et al. discloses a system for interrupting a data session between computers connected over a telephone line to allow the handling of an incoming call and restoring the connection between computers once the incoming call is terminated. The Goldman patent teaches a system wherein an interface must be physically located at both the host computer site and the terminal user site.

The present invention teaches a method and apparatus for interrupting computers connected over a telephone line to allow the handling of an incoming telephone call and restoring the connection between computers after the incoming call is terminated, but is far simpler than the system disclosed in the Goldman patent. In the present invention, there is no need for hardware or software to be physically located at both the host site and terminal site; the present invention teaches a system located only at the terminal site. Thus, the present invention does not limit a user to computers employing a matching interface, and allows the user to receive incoming calls while connected to any host computer. Because the present invention does not require the host computer to use any special hardware or software, fewer components are required than in the system disclosed in the Goldman patent, making the present invention less expensive to produce and install.

SUMMARY OF THE INVENTION

The present invention solves the problems described above by providing a method and apparatus to inform an online computer user of the presence of an incoming telephone call without disturbing the modem connection. The present invention comprises a telephony device connected to a telephone line, modem and telephone, and utilizes a call waiting service provided by the telephone company. Call waiting indicates the presence of an incoming call by providing a tone defined as two tone bursts separated by approximately 9.7 seconds of silence, each burst having a duration of approximately 300 milliseconds and a frequency of approximately 440 hz. Upon detection of a call waiting tone the device generates a four second warbling tone to a piezoelectric sounding device or energizes a ringer, thus alerting the user to the presence of the inbound telephone call. The user may answer or ignore the telephone call. Caller identifiers included in incoming calls may be used to alert the user of the origin of the incoming call before the user decides to accept or ignore the call.

When the device determines that the user has lifted the telephone set, it places the modem on hold, waits 700 ms to generate a hook flash signal, then connects the telephone to the telephone line, thus establishing a connection to the caller. When the user terminates the call by replacing the telephone set, the device may generate another hook flash signal and reconnect the modem to the Internet Service Provider. If the user picks up and hangs up quickly (within 5–7 seconds depending on baud rate, modem and service provider) the modem may be able to reestablish the previous connection without having to redial the ISP.

In one aspect, the present invention provides a method of interfacing an online computer user, a modem, and incoming telephone calls by detecting the presence of an incoming telephone call, notifying the computer user of the incoming call, placing the modem on hold, connecting the computer user with the incoming telephone call, and restoring the modem connection when the user terminates the incoming telephone call. Caller identification may also be performed, thus providing a filtering mechanism for the user. The user may be alerted to the identification of every incoming call, or only designated callers. The user may be alerted by a light emitting diode (LED), audible signal, or a voice delivered over a speaker.

In another aspect, the present invention provides a telephony device for interfacing an online computer user, modem and incoming telephone calls. The telephony device attached to a modem, telephone set, and telephone line utilizing the feature of call waiting. The telephony device comprises a connection for a telephone line, a connection for a telephone set and a connection for a modem. It further includes a switch for switching the telephone set and the modem to the telephone line, a processor for detecting the presence of call waiting signals and controllably operating the switch, and a signal generator for alerting the user of the presence of an incoming telephone call. The alerting signal may be a lighted display, audible sound or ringer, or a synthesized voice. The device may also incorporate a caller identification display to alert the user of the origin of every incoming call, or only alert the user to incoming calls from designated callers. Certain telephone numbers may be programmed into the device so that special treatment and priority can be given to those designated callers.

Other features and advantages of the present invention will become apparent from the following detailed description of the invention when it is considered in conjunction with the accompanying drawings.

BRIEF DESCRIPTION OF THE DRAWINGS

FIG. 1 is a block diagram illustrating the major components of the present invention;

FIG. 2 is a logic diagram showing the sequence of operation of the various states of the present invention; and FIG. 3 is a logic diagram showing the sequence of steps executed by the caller identification state of the present invention.

DETAILED DESCRIPTION OF THE DRAWINGS

Directing attention to FIG. 1, the major components of the present invention are illustrated in block diagram form. An incoming telephone line 10 is connected to device 18. Device 18 is a telephone switching device that switches the telephone line between a telephone set 16 and a modem 12. The telephone line 10 connects directly to the tip/ring connection 20. The modem 12 is connected to the device 18 via modem port 44 and line 48, thus enabling computer 14 to communicate over the telephone line 10 with remotely located computers. Likewise, the telephone set 16 is connected to the device 18 via telephone port 46 and line 50. Switching between the telephone set 16 and modem 12 is performed by processor 68, which controls the modem relay 24 and telephone relay 26 by lines 34 and 36, respectively. Between the modem relay 24 and the modem port 44 is the off-hook (OH) detector 38. The off-hook detector 38 monitors the lead 78 to detect a current draw, which indicates that the modem 12 is in use. Lead 42 indicates the current draw to the processor 68. Similarly, the telephone off-hook detector 40, located between the telephone relay 26 and telephone port 46, performs the same function for the telephone set 16, monitoring lead 80 and indicating the current draw to processor 68 over lead 43. The modem relay 24 and telephone relay 26 can switch between the tip/ring connection 20 and a hold bus 30. The hold bus 30 maintains +40 vdc and can place the telephone set 16 or the modem 12 on hold.

A 440 Hz filter 52 and 440 Hz detector 54 are also connected to the tip/ring connection 20. These two components monitor the telephone line 10 for the presence of a call waiting signal. The 440 Hz detector 54 alerts the processor 68 of the presence of the call waiting signal over lead 58. A caller identification detector 32 may also be included in the device 18, and is connected to the tip/ring connection 20 to monitor the telephone line 10 for caller ID signals that may accompany incoming telephone calls. The caller identification detector communicates the caller ID signal to the processor 68 over lead 56.

Piezoelectric sounder 74 and LED 76 are included in the device 18 to provide an indication to the user of various states of operation of the device 18. The LED 76 is capable of emitting different colors, and may emit a blinking or steady light. Piezoelectric sounder 74 emits an audible "beep" to signal the user. Both the piezoelectric sounder 74 and LED 76 are controlled by the processor 68. If desired, a simple ringer on the telephone port 46 may be substituted for the piezoelectric sounder 74.

The processor 68 incorporates memory 60, which contains program 62 that operates device 18. In the preferred embodiment of the present invention, an Intel 8051 microprocessor is used as the processor 68, but other similar and suitable microprocessors may be used. Memory 60 may also contain caller ID database 66, which contains caller identification numbers entered or programmed by the user. The caller identification numbers stored in the caller ID database 66 may be used to filter incoming calls and only allow calls that have caller ID numbers stored in the caller ID database to be indicated to the user or to indicate a priority call.

Memory 60 may also contain voice database 64, which contains synthesized voice messages that indicate the various states of operation of the device 18, as well as announces the name and telephone number of the caller to the user. The voice messages stored in the voice database 64 are played to the user over the speaker 72.

Turning now to FIG. 2, the device 18 may be defined by several states: idle state 100, telephone busy state 110, wait state 120, check state 130, buzz state 140, flash1 state 150, flash2 state 160, and caller ID (CID) retrieval state 170. When the device 18 is in the idle state 100, the telephone relay 26 and modem relay 24 are connected to the tip/ring connection 20 and the LED 76 displays a solid green light. If the modem port 44 picks up, the device 18 enters the wait state 120. If the telephone port 46 picks up, the device 18 enters the telephone busy state 110. No action is taken when the device 18 is in the phone busy state 110. The device 18 waits in the phone busy state 110 until the telephone set 16 is on-hook while maintaining a solid green LED 76.

Upon entering the wait state 120, the telephone port 46 is immediately placed on the hold bus 30 and a thirty-second count down is executed by the processor 68. During this thirty-second interval the LED 76 flashes green indicating that the modem 12 is off-hook, but the device 18 is not monitoring the telephone line 10 to detect a call waiting tone. This wait interval is required to avoid misinterpreting dial tone and initial modem negotiations as a call waiting tone. If the modem 12 hangs up, the device 18 returns to the idle state 100. If the telephone set 16 is off-hook the device 18 enters the flash1 state 150. Upon completion of the thirty-second countdown, the device 18 enters the check state 130.

When the device enters the check state 130, the LED 76 is immediately changed to solid red to indicate that the device 18 is monitoring telephone line 10 for a call waiting tone. If the call waiting tone is detected by the 440 Hz detector 54, the device 18 enters the buzz state 140. If a CID signal is detected, the retrieval state 170 is entered. The CID retrieval state, the user may ascertain the identity of the caller and decide whether to accept or reject the call. If the user rejects the call, control returns to the check state 130. If the user accepts the call, control is transferred to the buzz state 140. Returning to the check state 130, if a call waiting tone is detected without a caller ID signal, control is transferred directly to the buzz state 140. While in the buzz state 140, if the modem 12 hangs up, the device 18 enters the idle state 100. If the telephone set 16 goes off-hook, the device 18 enters the flash1 state 150.

When the device 18 enters the buzz state 140, the LED 76 flashes red at rapid intervals, while the piezoelectric sounder 74 or a ringer is activated for a duration of approximately four seconds. The device 18 then waits an additional four seconds silently while ignoring the 440 Hz detector 54. This delay insures modem renegotiation (caused by the call waiting tone) is not falsely interpreted as a second call waiting tone. At the end of eight seconds the check state 130 is activated. The device 18 enters the flash1 state 150 if the telephone set 16 goes off-hook during the eight-second interval. The device 18 enters the idle state 100 if the modem port 44 hangs up during the eight-second interval.

When the device 18 enters the flash1 state 150, the modem port 44 and the telephone port 46 are put on the hold bus 30 for 700 ms to generate a hook flash signal. The LED turns to flashing green, indicating call waiting detection is disarmed. The LED continues to blink green if modem is off-hook. If the modem hangs up, the LED 76 changes to solid green. At the end of this interval the telephone port 46 is put on tip/ring connection 20 and the telephone set 16 is connected to the calling party. The microphone 70 and speaker 72 may be activated at this time, enabling the device 18 to provide a hands free speaker telephone. The device 18 waits in the flash1 state 150 indefinitely until the telephone set 16 hangs up. If the telephone port 46 hangs up, the device 18 enters the flash 2 state 160.

When the device 18 enters the flash2 state 160, the modem port 44 and the telephone port 46 are put on the hold bus 30 for 700 ms to generate a hook flash signal. The LED 76 continues to indicate the modem hook status. At the end of this interval, the modem port 44 is put on the tip/ring connection 20 and the modem 12 is reconnected to the telephone line 10. If the modem 12 is reconnected within an acceptable time period, usually five to seven seconds, the modem connection is automatically reestablished without the need to redial. Upon generation of the hook flash signal, the wait state 120 is activated.

While the above explanation of operational states describes different uses of the piezoelectric sounder 74 and LED 76, each operational state may also be indicated to the user by an appropriate voice message retrieved from the voice database 64 and played over the speaker 72. FIG. 3 shows the logical sequence of steps executed by the program 62 to handle caller identification. At step 200, the device 18 is powered up, and the caller ID detector 32 begins monitoring the tip/ring connection 20 for the presence of a caller ID signal (step 210). The caller ID signal may be the type supplied by telephone companies. When an incoming call contains caller ID information, the caller ID detector indicates the caller ID to the processor 68 (step 220). At step 230, the processor 68 compares the caller ID information with the caller ID database 66, which contains telephone numbers entered or programmed by the user. If there is a match between the incoming caller ID information and a telephone number in the caller ID database 66, the user is alerted at step 250. If there is no match, the incoming call may be ignored and the user is not alerted (step 260). In this manner, the user may use the device 18 to filter or screen incoming calls. The user may be alerted by the speaker 72, which will announce numbers or prerecorded names contained in the voice database 64. Alternatively, the piezoelectric sounder 74 may be activated to indicate the presence of the incoming call which contains a matching telephone number. An LCD display showing the caller's identification may also be used.

While an improved method and apparatus for alerting a user of the presence of an incoming telephone call received while the user is connected to a remote computer via a modem has been described and illustrated in detail, it is to be understood that changes and modifications to the present invention may be achieved without departing from the spirit of the present invention.

What is claimed is:

1. A method of interfacing a computer user, a telephone, a modem, and incoming telephone calls with a telephone line stand alone switch device utilizing the feature of Call Waiting, said method comprising the steps of:
    a) providing a telephony device for controllably switching a telephone line between a modem and a telephone set;
    b) detecting the presence of a Call Waiting signal received while said modem is connected to said telephone line, said signal indicative of an incoming telephone call;
    c) filtering said incoming telephone call by using predetermined call identification information;
    d) notifying the user of said incoming telephone call when that call matches said predetermined caller identification information;
    e) placing said modem on hold;
    f) connecting the user with the incoming telephone call through the telephone set; and
    g) automatically terminating said modem connection when an off-hook detection means determines the telephone set is in use.

2. A method for interfacing as described in claim 1, further comprising the steps of determining caller identification information from said incoming telephone call and displaying the caller identification information to the user.

3. A method for interfacing as described in claim 1, further comprising the step of automatically terminating said modem connection when said off-hook detection means determines said telephone set is in use.

4. A method for interfacing as described in claim 1, wherein said step of notifying comprises emitting a light signal indicative of the presence of an incoming telephone call.

5. A method for interfacing as described in claim 1, wherein said step of notifying comprises emitting an aural signal to indicate the presence of an incoming telephone call.

6. A method for interfacing as described in claim 5, wherein said step of notifying comprises emitting a voice indicating the presence of an incoming telephone call.

7. A method for interfacing as described in claim 1, further comprising the step of indicating the individual states of operation of said device.

8. A method for interfacing as described in claim 1, further comprising the step of emitting a signal indicative of a state of operation wherein said device is idle.

9. A method for interfacing as described in claim 1, further comprising the step of emitting a signal indicative of a state of operation wherein said telephone is in use.

10. A method for interfacing as described claim 1, further comprising the step of emitting a signal indicative of a state of operation wherein said telephone is in use.

11. A method for interfacing as described in claim 1, further comprising the step of restoring the modem connection when the user terminates the answered incoming call waiting telephone call.

12. A stand alone telephony device for interfacing an online computer user, modem and incoming telephone calls, the telephony device being attached to a modem, telephone set, and telephone line utilizing the feature of Call Waiting, said device comprising:
    a) a switching means for connecting a telephone line to a telephone set and a computer modem;
    b) a signal means for alerting the user of the presence of an incoming telephone call on said telephone line;
    c) a processor for detecting the presence of a Call Waiting signal on said telephone line while said modem is connected to said telephone line and controllably operating said switch means and said signal means, and means for determining caller identification along with said incoming telephone call;
    d) said means for determining caller identification further includes means for screening incoming telephone calls and initiating said signal means to alert said user to incoming calls that match predetermined caller identifications and ignoring incoming calls that do not match said predetermined caller identifications;
    e) an off-hook detection means for detecting when said telephone set is in use as a result of the user being alerted to the incoming telephone call;
    f) means for connecting the modem to a hold bus when the off-hook detection means detects that the telephone set is in use; and g) connection means for connecting said telephone line, modem, and telephone set to said device.

13. The telephony device as defined in claim 12, wherein said signal means comprises a display means for emitting signals indicative of one or more states of operation of said device.

14. The telephony device as defined in claim 13, wherein said display means further comprises means for emitting a signal indicative of a state of operation wherein said device is idle.

15. The telephony device as defined in claim 13, wherein said display means further comprises means for emitting a signal indicative of a state of operation wherein said telephone is in use.

16. The telephony device as defined in claim 13, wherein said display means further comprises means for emitting a signal indicative of a state of operation wherein said device is idle.

17. The telephony device as defined in claim 12, wherein said signal means comprises an aural signal means.

18. The telephony device as defined in claim 17, wherein said aural signal means includes a voice synthesizer means.

19. The telephony device as defined in claim 12, further comprising a speaker and microphone that may be used to provide a hands free speaker telephone.

20. A method of interfacing a computer user, a telephone set, a modem and incoming telephone calls with a telephone line stand alone switch device utilizing the features of Call Waiting and Caller ID, the method comprising the steps of:
   a) providing a telephone device for controllably switching a telephone line between a modem and a telephone set;
   b) detecting the presence of a Call Waiting signal received while said modem is connected to said telephone line, said signal indicative of an incoming telephone call;
   c) disconnecting said modem from the telephone line and temporarily placing the modem on hold;
   d) temporarily placing the telephone line on-hook so that Caller ID data can be received;
   e) reconnecting the modem to the telephone line after receiving said Caller ID data;
   f) filtering said incoming Caller ID data by using predetermined Caller Identification data;
   g) notifying the user of incoming telephone calls wherein the Caller ID data matches said predetermined Caller Identification data; and
   h) if the user decides to accept the call, disconnect the modem from the telephone line and connect the telephone set to the line.

21. The telephony device as defined in claim 12, which further includes means for connecting the modem means and telephone set to a hold bus.

* * * * *